A. P. WINSLOW.

Car Roof.

No. 2,050.

Reissued Aug. 8, 1865.

Witnesse

J Brawerd

W H Pennings

Inventor:

A P Winslow

UNITED STATES PATENT OFFICE.

A. P. WINSLOW, OF CLEVELAND, OHIO.

IMPROVED ROOF FOR RAILROAD-CARS.

Specification forming part of Letters Patent No. 25,071, dated August 9, 1859; Reissue No. 2,050, dated August 8, 1865.

*To all whom it may concern:*

Be it known that I, A. P. WINSLOW, of Cleveland, in the county of Cuyahoga and State of Ohio, have invented certain new and useful Improvements in Roofs for Railroad-Cars and Hurricane-Decks of Vessels; and I do hereby declare that the following is a full and exact description of the same, reference being had to the annexed drawings, making part of this specification, in which—

Figure 1:
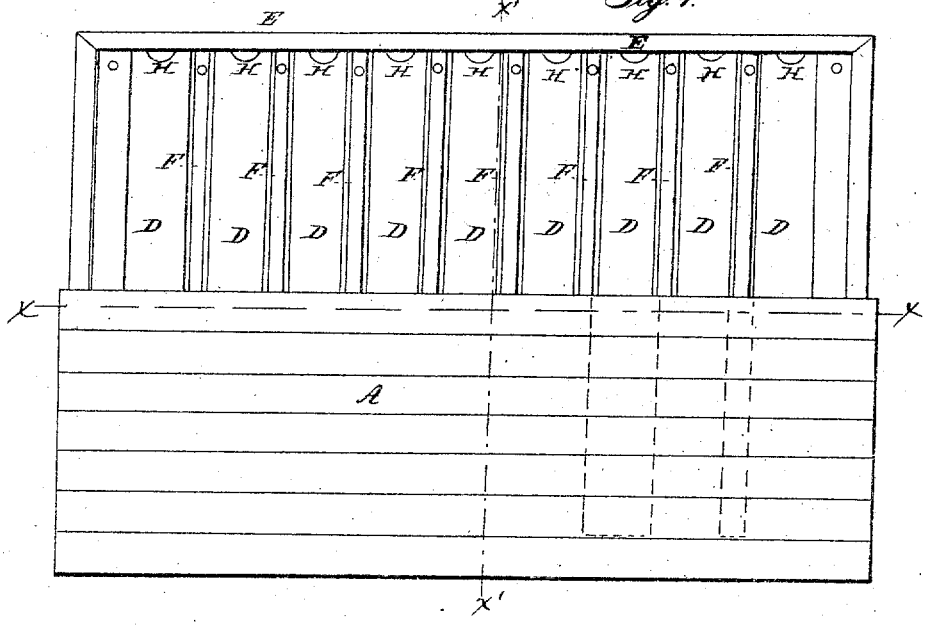
Figure 2:
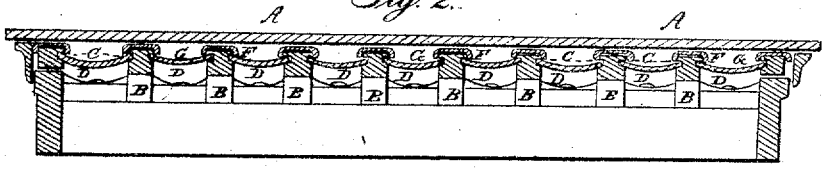
Figure 3:
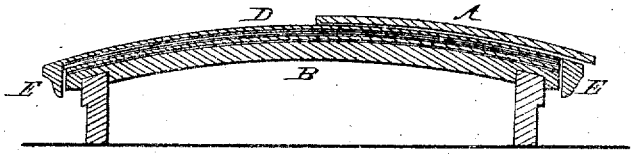
Figure 5:
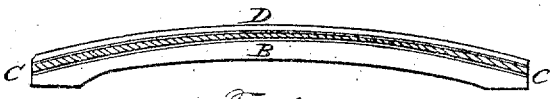
Figure 4:
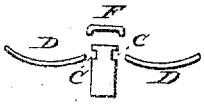

Figure 1 is a plan view. Fig. 2 is a longitudinal section in the direction of the line $x$ $x$ in Fig. 1. Fig. 3 is a transverse section in the direction of the line $x'$ $x'$ in Fig. 1. Figs. 4 and 5 are detached sections, which will be referred to in the following description.

Like letters denote like parts in the several views.

The outside covering A, Figs. 1, 2, 3, of the roof may be of wood covered over in the usual manner. In Fig. 1 a portion of this outside roof is removed for the purpose of showing my improvement. The rafters B may be made and connected to the railroad-car, and the upper cabin of vessels in any desirable manner suitable for this purpose. In the sides of each rafter is cut a groove, C, Fig. 4, the curve of which conforms to the top of the rafter and extends the entire length of it, as seen in Fig. 5. Between the rafters in the grooves is placed a metallic plate or sheet, D, which extends the entire length across the car, as indicated in Figs. 1, 3, 5. The ends of the plates D extend over the sides of the car or cabin to the inside of molding or cornice E of the roof. This cornice prevents the plates D from sliding laterally out of place. On the top of each rafter is fastened the cap F, which extends the whole length of the rafter, as seen in Fig. 3. The sides of this cap are so turned that the sides lap down on the plates D, as seen in Fig. 2.

The plates herein shown are curved for the purpose of conveying all moisture or wet that may get under the roof A to the center of the plates from the sides and grooves. Straight, angular, or corrugated plates may be employed instead of the plates D; but I prefer the latter, as I consider it better adapted to the purpose designed.

Between the roof or sheathing A and the plates D is formed an air-chamber, G, into which a current of air is continually passing through the openings H at each end of the plates, and through these openings are discharged all wet, dust, &c., which may gather in the chambers. The chambers being open to the atmosphere by means of the openings H, the interior of the car is rendered much more cool and comfortable than when the sun strikes upon a single roof and the heated air is confined, as is now the case. The plates are made to fit not tightly in the grooves, but so that they will move readily and adjust themselves to the straining and springing of the car or vessel, and so that in case one of the plates should become injured it may be easily withdrawn and replaced.

In the ordinary mode of covering the roofs of cars with tin or iron, the strain and continual jarring of the cars and the expansion and contraction cracks and loosens the metallic sheets from the roof, then leakage follows, which does more or less damage, particularly on freight-cars, as the goods become injured to a greater or less extent when thus exposed, and when the roof is composed entirely of wood the joints or seams become opened by exposure to the weather and racking of the cars, which again exposes the freight to injury. Again, the wood roof is at all times liable to be fired by sparks from the engine. With my improved roof these difficulties are obviated, as all leakage from the roof A is conveyed by the plates D through the openings H, and in case the roof A should be fired the metallic roof below would prevent the fire from injuring the freight, so that the train could be stopped and the fire subdued without injury to the lower roof or the goods. This manner of constructing the roof of railroad-cars is much less expensive and more durable than the ordinary metallic roofing, and it may be applied to the hurricane-decks of steamboats, propellers, and other vessels using cabins with hurricane-decks. All structures of this kind are more or less subject to continual strain and racking of the timbers, and this roof by its peculiar construction is rendered flexible to a certain extent, and will adjust itself to the working of the car or vessel.

The outside sheathing, A, may be placed over the car-lines and plates either transversely, as shown, or longitudinally with them, and in place of being curved, as represented, it may be in the angular form of an ordinary gable-roof.

What I claim as my improvement, and desire to secure by Letters Patent, is—

1. The plates D, caps F, and grooved rafters B, when arranged substantially as herein set forth, for the purpose described.

2. Forming an air-chamber, G, between the sheathing or roof A and plates D, when arranged as herein described, for giving free circulation of air to cool the car, and at the same time allow the water, dust, &c., to pass off at the ends of said plates.

A. P. WINSLOW.

Witnesses:

W. H. BURRIDGE,

J. HOLMES.